M. HIRSHFELD.
JUNCTION BOX.
APPLICATION FILED APR. 23, 1920.

1,402,769.

Patented Jan. 10, 1922.

2 SHEETS—SHEET 1.

INVENTOR
MAX HIRSHFELD
BY Bradbury & Coswell
ATTORNEYS

M. HIRSHFELD.
JUNCTION BOX.
APPLICATION FILED APR. 23, 1920.

1,402,769.

Patented Jan. 10, 1922.
2 SHEETS—SHEET 2.

INVENTOR
MAX HIRSHFELD
BY Bradbury & Caswell
ATTORNEYS

UNITED STATES PATENT OFFICE.

MAX HIRSHFELD, OF ST. PAUL, MINNESOTA.

JUNCTION BOX.

1,402,769.  Specification of Letters Patent.  Patented Jan. 10, 1922.

Application filed April 23, 1920. Serial No. 375,984.

*To all whom it may concern:*

Be it known that I, MAX HIRSHFELD, a citizen of the United States, residing at St. Paul, in the county of Ramsey and State of Minnesota, have invented a new and useful Improvement in Junction Boxes, of which the following is a specification.

This invention relates to junction boxes, which can be employed for electrical conduits and conductors used in interior wiring, the construction of the box being such as to facilitate the connection of conduit pipes thereto. More particularly this improvement provides a simple and inexpensive junction box which can be used in any of the many combinations of junctions instituted between branches of a conduit system without having to provide a special junction box for each particular kind of a junction used. It is the present custom to make separate boxes or casings to meet these numerous conditions, and as a result jobbers must of necessity have in stock an undesirably large number of junction boxes to meet the various conditions enumerated. An object of this invention is to provide a junction box adaptable for various conditions of use and having various parts interchangeable, so that the same box may be positioned for various different connections in such manner as to nevertheless afford the necessary connections to the conduits and protection to the electrical conductors and fixtures contained in the box. It is further an object to provide such a box of relatively simple structure, whereby it may be manufactured at a cost less or but a little if any greater than the cost of the individual types of boxes which are now used.

With the above and other objects and advantages in view, the invention resides in the novel combination, arrangement and formation of parts more particularly hereinafter described and more particularly pointed out in the appended claims.

Figure 1:
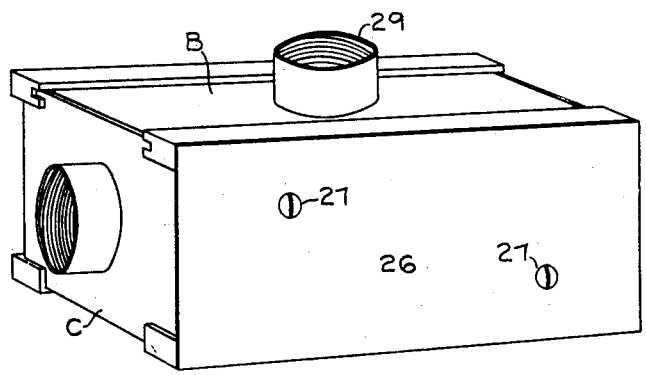
Figure 2:
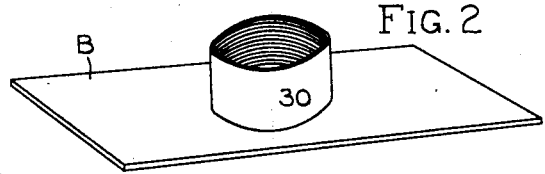
Figures 5, 6:
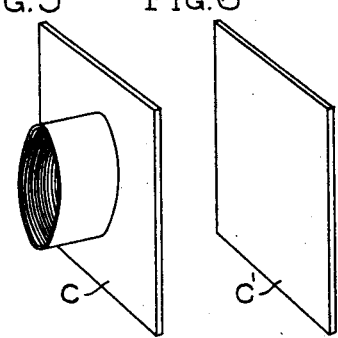
Figure 3:
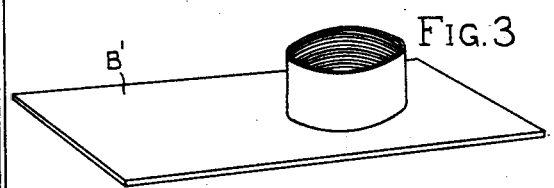
Figure 4:
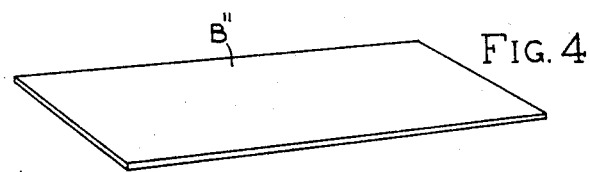
Figure 8:
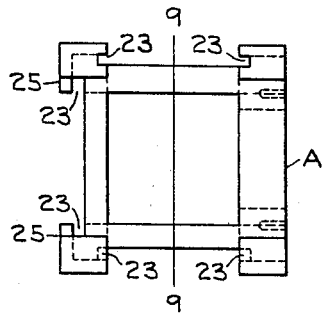
Figure 7:
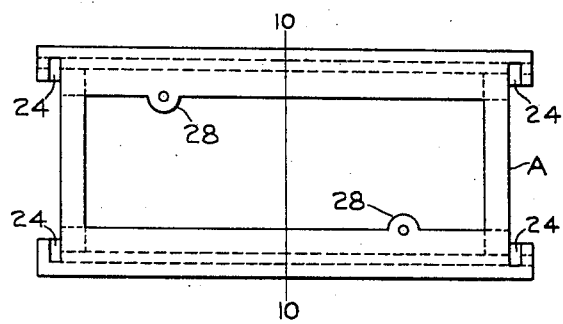
Figure 10:
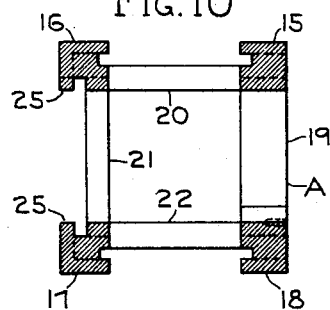
Figure 9:
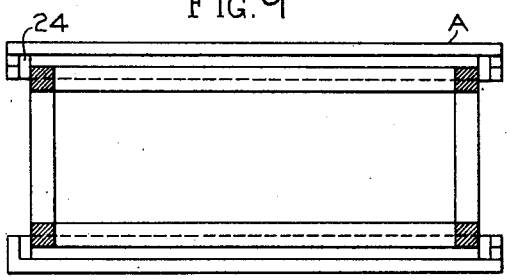
Figure 11:
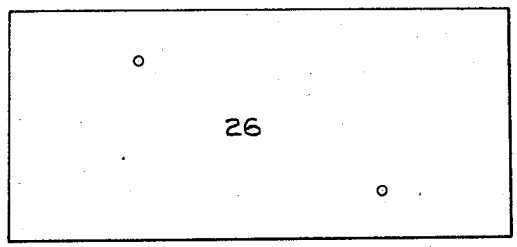

In the accompanying drawings forming part of this specification, Fig. 1 is a perspective view of my invention when the composite parts are assembled; Figs. 2, 3 and 4 are perspective views of different kinds of sides, which can be used as desired to produce the bottom, top and ends of my improved junction box; Figs. 5 and 6 are perspective views of end plates which can be used as desired to form the ends of my improved junction box; Fig. 7 is a front elevation of the skeleton frame of my improved junction box; Fig. 8 is an end view of the structure shown in Fig. 7; Fig. 9 is a longitudinal section taken on the line 9—9 of Fig. 8; Fig. 10 is a cross section taken on the line 10—10 of Fig. 7, and Fig. 11 is a plan of the cover plate.

My invention contemplates the construction by casting, stamping or otherwise of a skeleton frame A of such shape and size that the remaining parts of the box can be easily assembled on said frame to produce a completed box or receptacle in such a manner that the box may be adapted to the peculiar conditions arising. The frame has four longitudinal corner bars 15, 16, 17 and 18, and four transverse corner bars 19, 20, 21 and 22 at each end, all being integral. The inner faces of each pair 15 and 16, 16 and 17, and 17 and 18 of the longitudinal corner bars have corresponding pairs of longitudinal channels 23, which are adapted to receive the longitudinal side edges of side plates as are hereinafter described. Said side plates such as B, B' and B" are of thin sheet material of oblong shape having substantially parallel side edges which are adapted to enter the pairs of channels 23 and slide into closing position, thus closing the top, bottom and back of the frame. The ends of the longitudinal corner bars project outwardly beyond the transverse corner bars a sufficient distance to contain pairs of corresponding channels 24, which are adapted to receive end plates such as C'—C', with their edges overlapping the ends of the side plates. In this position the end plates lock the side plates from sliding out of the frame. The channels 24 in the back pair of longitudinal bars 16 and 17 have stop shoulders 25 to limit the insertion of the end plates with their edges engaging over the ends of the side plates and when the front edges of the end plates correspond with the front faces of the front pair of longitudinal bars 15 and 18. The front of the frame is adapted to be closed by a cover 26 of any suitable construction, which is secured on the frame by screws 27 or any other means of attachment desired. Bosses 28 on the front pair of longitudinal corner bars 15 and 18 are provided to receive the shanks of the screws. The ends of the front plate overlap the front edges of the end plates to prevent the removal of the latter. Thus when all of the wall plates have been assembled in the frame and the cover fastened, all of said walls are interlocked to prevent removal.

The top, bottom, back and end plates may each be blank as shown in Figs. 4 and 6, or they may be provided with conduit receiving openings 29, which as shown are surrounded by nipples 30; integral with the plate, into which the ends of the conduits are received and held. As many of these openings and nipples to receive and hold conduits may be provided as desired to suit the conditions at each junction or station. For instance, in Figs. 2 and 3 the opening and nipple are positioned in different positions. By choosing the kind of side or end wall (either blank or provided with a conduit opening and nipple at the desired position) any kind of junction can be constructed on a standard skeleton frame. This reduces cost of construction and facilitates and quickens the construction of junctions in conduit systems without having to carry in stock a large number of differently constructed junction boxes.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention what I claim as new and desire to protect by Letters Patent is:

1. A conduit junction box comprising a skeleton frame grooved to receive plates, a closure plate slidable into closing position in said frame, a second combination closure and locking plate slidable into said frame and forming a stop to prevent the displacement of said first plate, and a third plate removably attached to the frame and adapted to secure said second plate in closing position, a number of said plates being formed with openings therein for conduits.

2. A conduit junction box comprising a skeleton frame formed with communicating pairs of channels therein, closure plates removably inserted in said channels, two of said plates forming locking members adapted to overlap the ends and secure the remainder of said plates, and a cover removably attached to the frame and overlapping the locking members to hold said locking members against removal from their respective channels, a number of said plates being formed with openings for conduits.

3. A conduit junction box, comprising, in combination, a receptacle frame having longitudinal and transverse corner bars forming a skeleton outline of a parallelopiped, said bars being formed with pairs of channels, plates forming top, bottom, back and end walls of said box, said top, bottom and back walls being adapted to enter said channels and slide into closing position on said frame and said end walls being adapted to enter the channels and slide into closing position over the ends of said frame with their edges overlapping the end edges of the top, bottom and back plates to lock the latter closed, a cover adapted to close the front of said frame with its ends overlapping the front edges of said end plates and means for fastening said cover in closing position on the front of said frame, part of said top, bottom, back and end plates being formed with outlet openings for the conduits.

4. A conduit junction box, comprising, in combination, a frame forming the skeleton outline of the box, plates adapted to form the top, bottom, back and ends on the frame, said frame being formed with pairs of longitudinal and transverse grooves into which said plates are insertable with an end plate overlapping the end edges of a side plate to lock the latter in box closing position and a cover secured over the front of said frame and the outer edge of said end plate to prevent the withdrawal of the latter, a number of said plates being formed with an outlet opening for a conduit.

5. A conduit junction box, comprising, in combination, a frame forming the skeleton outline of the box, separate plates adapted to form the top, bottom, back and ends on the frame, said frame being formed with pairs of longitudinal and transverse grooves respectively at its sides and ends into which said plates are insertable with one plate overlapping the end of a companion plate to interlock the overlapped plate against removal while the plates are in box closing position, and a cover secured over the front of said frame and the outer edge of one of said plates to prevent the withdrawal of the latter plate, part of said plates being formed with outlet openings for sections of the conduit.

In testimony whereof I have signed my name to this specification.

MAX HIRSHFELD.